US009800676B2

(12) United States Patent
Lee

(10) Patent No.: US 9,800,676 B2
(45) Date of Patent: Oct. 24, 2017

(54) METHOD AND APPARATUS FOR PROVIDING LOCATION-BASED SERVICES

(71) Applicant: Chiun Mai Communication Systems, Inc., New Taipei (TW)

(72) Inventor: Tsung-Han Lee, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 56 days.

(21) Appl. No.: 14/948,932

(22) Filed: Nov. 23, 2015

(65) Prior Publication Data

US 2016/0173624 A1 Jun. 16, 2016

(30) Foreign Application Priority Data

Dec. 10, 2014 (CN) .......................... 2014 1 0758112

(51) Int. Cl.
*H04L 29/08* (2006.01)
*H04W 4/02* (2009.01)

(52) U.S. Cl.
CPC .............. *H04L 67/18* (2013.01); *H04L 67/16* (2013.01); *H04W 4/025* (2013.01)

(58) Field of Classification Search
CPC ................................ H04W 4/02; H04W 4/023
See application file for complete search history.

(56) References Cited

U.S. PATENT DOCUMENTS

| | | | | |
|---|---|---|---|---|
| 2005/0114185 | A1* | 5/2005 | Rodriguez | G06Q 30/06 705/5 |
| 2005/0143095 | A1* | 6/2005 | Jacob | H04W 4/02 455/456.3 |
| 2011/0053552 | A1* | 3/2011 | Kim | G01C 21/3438 455/404.2 |
| 2012/0203599 | A1* | 8/2012 | Choi | G06Q 30/02 705/13 |
| 2012/0278195 | A1* | 11/2012 | Joseph | G06Q 50/10 705/26.2 |
| 2013/0132246 | A1* | 5/2013 | Amin | G06Q 40/10 705/34 |
| 2013/0132887 | A1* | 5/2013 | Amin | G06F 3/048 715/781 |
| 2013/0246207 | A1* | 9/2013 | Novak | G06Q 30/0283 705/26.2 |
| 2014/0058896 | A1* | 2/2014 | Jung | G06Q 30/0623 705/26.61 |

(Continued)

*Primary Examiner* — Dung Hong
(74) *Attorney, Agent, or Firm* — Steven Reiss

(57) ABSTRACT

The present disclosure provides a method for providing location-based service, which can be implemented on an electronic apparatus. The method includes receiving, by the electronic apparatus, a service request from a first device, wherein the service request includes a service requested by a service requester and a location data corresponding to a location of the service requester; retrieving, by the electronic apparatus, a list of service providers matching the service request; transmitting, by the electronic apparatus, the list of the service providers and associated information corresponding to each service provider to the first device; receiving, by the electronic apparatus, information associated with one service provider selected by the service requester; transmitting, by the electronic apparatus, the service request to a second device of the selected service provider for confirmation.

16 Claims, 3 Drawing Sheets

(56) References Cited

U.S. PATENT DOCUMENTS

| | | | |
|---|---|---|---|
| 2014/0129302 A1* | 5/2014 | Amin | G06Q 30/0641 705/13 |
| 2014/0129951 A1* | 5/2014 | Amin | G06Q 50/30 715/738 |
| 2014/0172727 A1* | 6/2014 | Abhyanker | G06Q 30/0645 705/307 |
| 2015/0099461 A1* | 4/2015 | Holden | G01C 21/367 455/39 |
| 2015/0112585 A1* | 4/2015 | Knepper | G06Q 30/0266 701/410 |
| 2015/0206267 A1* | 7/2015 | Khanna | G06Q 50/30 705/5 |
| 2016/0110836 A1* | 4/2016 | Garg | G06Q 20/405 705/13 |
| 2016/0135006 A1* | 5/2016 | Fjeldsoe-Nielsen | H04B 1/3827 455/456.3 |
| 2016/0138928 A1* | 5/2016 | Guo | G01C 21/3438 701/537 |

* cited by examiner

US 9,800,676 B2

METHOD AND APPARATUS FOR PROVIDING LOCATION-BASED SERVICES

CROSS-REFERENCE TO RELATED APPLICATIONS

This application claims priority to Chinese Patent Application No. 201410758112.3 filed on Dec. 10, 2014, the contents of which are incorporated by reference herein.

FIELD

The subject matter herein generally relates to a data processing, particularly to a method and an apparatus for providing location-based services via network.

BACKGROUND

Social networks such as Facebook, Twitter. Google+ are operated by building links or connections among users based on their social relationships. Recently, with the popularity of portable electronic devices increasing, it has become increasingly convenient and easier to obtain the location information associated with a user. A desire to be able to search through the social network for any other registered users that share the same interests has arisen. For instance, when a user needs a service, he or she may want to be able to directly search on the associated social network and obtain information on other users on the social network providing the service.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
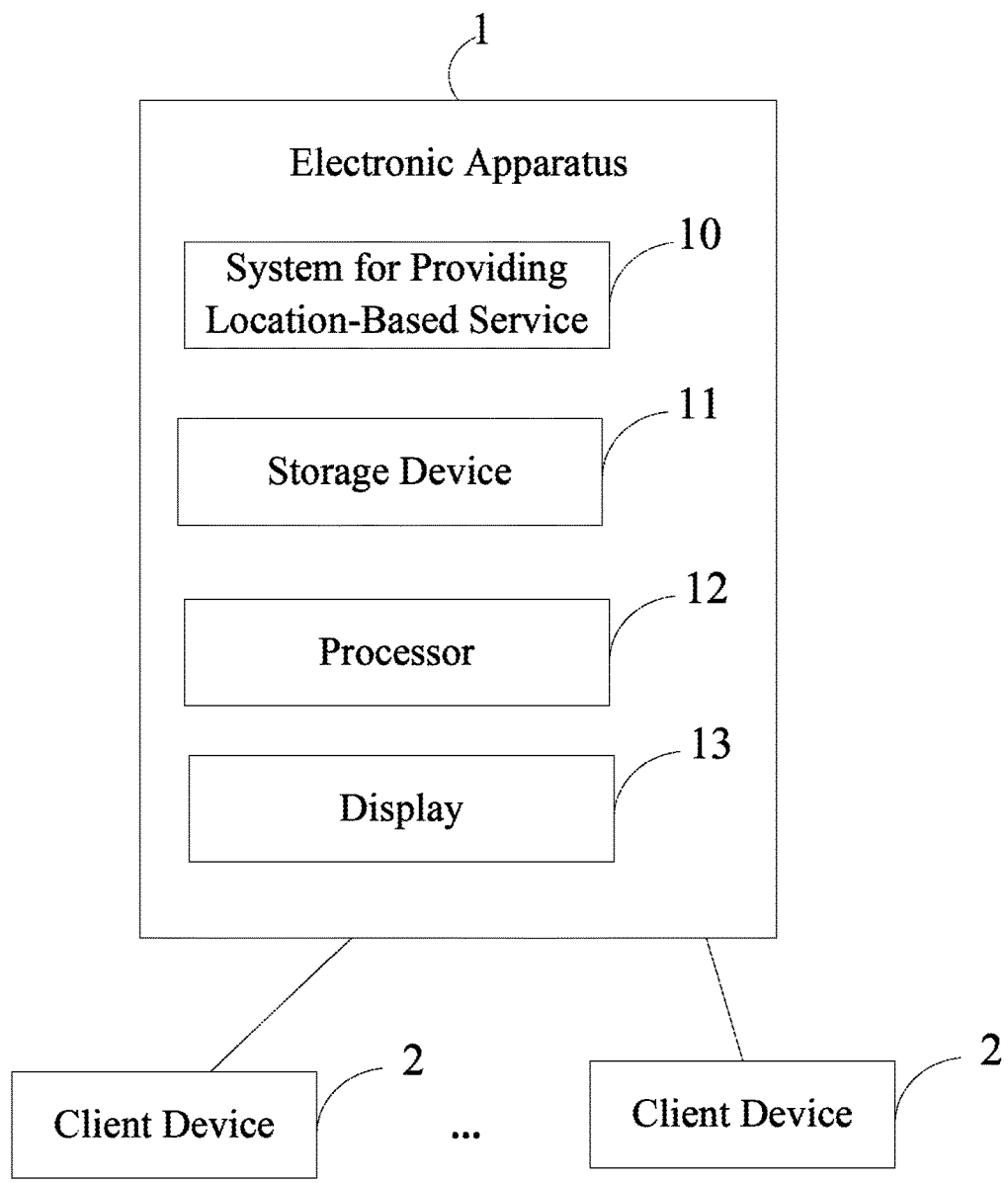
FIG. 1 is a block diagram illustrating an operation of a system for providing location-based service provided in accordance to an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The term "comprising" is defined as "including, but is not necessarily limited to"; it specifically indicates open-ended inclusion or membership in a so-described combination, group, series and the like.

The present disclosure is described in relation to a service providing system, which is operable to provide a platform for users to coordinate and conduct service trading operations. Particularly, the present disclosure provides a location-based service providing system, operable to coordinate between a service provider and a service requester over a network in such a manner that the service provider can provide a service that matches the demand of a service requester based on the location of the service requester, thereby adding convenience to the daily life and increasing living quality of the user.

FIG. 1 illustrates a diagram of an operation of a system for providing location-based service provided in accordance to an exemplary embodiment of the present disclosure. A system for providing location-based service 10 (hereinafter "the system 10") is configured to be operated on an electronic apparatus 1. The electronic apparatus 1 includes but is not limited to a server, a personal computer, a workstation computer, a smartphone, a personal digital assistance (PDA) or any other equivalent computing device.

In the instant embodiment, the electronic apparatus 1 is connected to a plurality of client devices 2 via a network. Each of the client devices 2 can include but is not limited to a smartphone, a PDA, a laptop, tablet, or any other equivalent computing device capable of providing location data. An application program is installed on each client device 2 and the application program enables the client device 2 to communicate with the electronic apparatus 1 and perform location-based service finding operations based on a request of the service requester (e.g., the user of the client device 2).

In one embodiment, each client device 2 may download the codes or instructions associated with the application program from the electronic apparatus 1 via the network. In another embodiment, the application program may be built-in in the client device 2. The application program may be initiated at the startup of the client device 2 or initiated by the user using the client device 2. The user in the instant embodiment may be the service requester or the service provider, who uses the client device 2 to communicate with the electronic apparatus 1.

The electronic apparatus 1 in the instant embodiment includes a storage device 11, a processor 12, and a display 13. The processor 12 is electrically coupled to the storage device 11 and the display 13. The system 10 is communicatively coupled to the storage device 11, the processor 12, and the display 13.

The storage device 11 is configured to store program codes and data for the processor 12 to access and execute the corresponding program codes to implement the system 10. The storage device 11 is further configured to store processing data for the system 10 and the processor 12 to access. The storage device 11 includes but is not limited to a smart media (SM) card, a secure digital (SD) card, and a flash card.

In the instant embodiment, the storage device 11 stores a service database. The service database includes the service information associated with each service provider. The service database may be built by recording a plurality of daily routine routes associated with a plurality of service providers and the service information. The daily routine routes and the service information associated with each of the service providers may be provided and uploaded by each individual service provider to the service database. In one embodiment, service providers may each record daily routine routes and the service information using the corresponding client device 2 and upload the daily routine routes to the service database via the network.

The service information herein includes but is not limited to service route information, service time, and/or a type of service associated with services provided by each service provider. The service route information may include a service route formed by one or more route segments; and each route segment encompasses one or more service locations. The service route and service information may be displayed on the display 13 in a form of 2D or 3D global positioning system (GPS) map. The service route associated with the service provided by the service provider may be a commuting route between work and home, a travelling route of a business trip, the traveling route to grocery store, or any other daily routine routes that the service provider will travel to provide the service requested. The service time indicates the available time for the service provider to provide the service. The type of service provided includes but is not limited to a ride service, a car-pool service, a procurement service, a food delivery service, a child care service, a senior care service, tutor finding service, and/or a designated driver finding service.

The storage device 11 may not be built-in in the electronic apparatus 1. In at least one embodiment, the storage device 11 is configured to connect to the electronic apparatus 1 externally. The storage device 11 can be configured to connect to the electronic apparatus 1 through a cable or the network.

The processor 12 is the main operational core of the electronic apparatus 1 and is programmed to execute one or more computerized operations of the electronic apparatus 1 and other applications, to control the overall operation of the electronic apparatus 1. The processor 12 in the instant embodiment may be implemented by a central processing unit (CPU), a microcontroller or a data processor programmed with necessary firmware, however the present disclosure is not limited to the example provided herein.

The display 13 is configured to display the service provider, and the service information of the service provider. The display 13 may be implemented as a touch panel, a liquid crystal display panel, or any other displaying apparatus capable of displaying text and/or graphical content to an operator (e.g., a system administrator of the electronic apparatus 1

Accordingly, by establishing a service database containing a plurality of routes travelled by a plurality of users in their daily life, the system 10 is operable to enable a user to quickly find a service provider to provide a service requested by a user at a specific location from the service database upon receiving a service request, thereby bringing convenience to the daily life and increasing living quality of the user.

Figure 2:
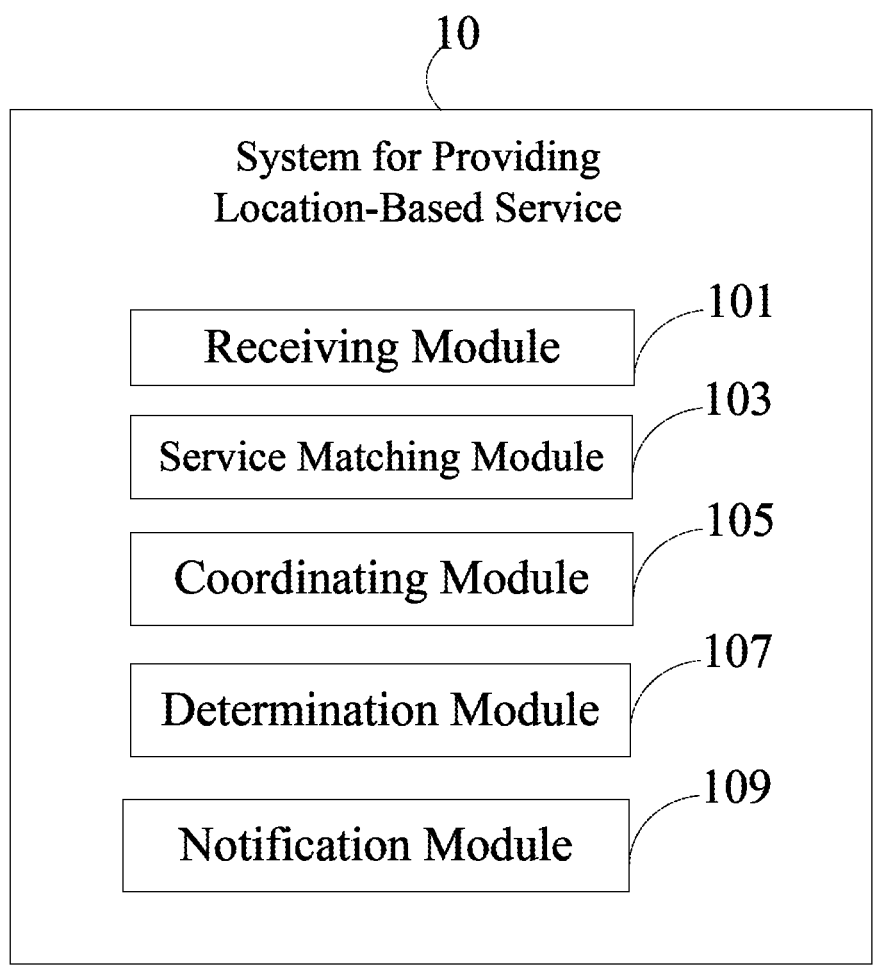
FIG. 2 is a block diagram illustrating the architecture of a system for providing location-based service provided in accordance to an exemplary embodiment of the present disclosure.

Referring to FIG. 2 in conjunction with FIG. 1, which illustrates the system architecture of the system 10 provided in accordance to an exemplary embodiment of the present disclosure. The system 10 includes a receiving module 101, a service matching module 103, a coordinating module 105, a determination module 107, and a notification module 109.

The receiving module 101 is coupled to the service matching module 103, the coordinating module 105, the determination module 107. The coordinating module 105 is further coupled to the service matching module 103 and the determination module 107. The determination module 107 is coupled to the notification module 109. The receiving module 101 is configured to receive a service request sent by the client device 2 of the service requester. The service request may include a service requested and a location data corresponding to the location of the service requester. The location data herein is generated by the client device 2 of the service requester. In the instant embodiment, the location data may include the GPS data, which contains the latitude and longitude data of the client device 2. The service herein may include but is not limited to a ride service, a car-pool service, a procurement service, a food delivery service, a child care service, a senior care service, a tutor finding service, and a designated driver service. In another embodiment, the service may be a witness finder for car accident or any crime.

The service matching module 103 is configured to operatively retrieve a list of the service providers matching the service request of the service requester from the storage device 11 in response to the service request received. The service matching module 103 may search the service database by comparing time and the corresponding route using Fuzzy logic, to locate the potential service provider that provides the service matching the service request of the service requester.

In one embodiment, the service matching module 103 can be configured to provide a shortest service route to the location of a service provider recorded in the service database to the client device 2 of service requester based on the location data of the service requester when no match to a service route that encompasses the location of service requester is found in the service database.

The coordinating module 105 is configured to transmit the list of the service providers and the service information corresponding to each service provider to the client device 2 of the service requester. After receiving the list of the service providers, the service requester selects a service provider from the list using the client device 2; and the client device 2 of the service requester then sends information associated with the selected service provider to the electronic apparatus 1.

Afterwards, the receiving module 101 receives the information associated with the selected service provider from the client device 2 of the service requester, and then the coordinating module 105 transmits the service request to the client device 2 of the selected service provider for confirmation.

The determination module 107 is configured to verify whether the service provider selected by the service requester is available for providing the service to the service requester. In the instant embodiment, when the client device 2 of the selected service provider receives a confirmation input from the service provider, the client device 2 will generate a confirmation message in response to the confirmation input and send the confirmation message to the electronic apparatus 1. When the electronic apparatus 1 receives the confirmation message, the determination module 107 determines that the selected service provider is able to provide the service to the service requester and drives the notification module 109 to transmit contact information of the selected service provider to the client device 2 of the service requester. On the other hand, when the client device 2 of the selected service provider receives a declining input from the selected service provider, the client device 2 will generate a request declining message in response to the declining input and send the request declining message to the electronic apparatus 1. When the electronic apparatus 1 receives the request declining message, the determination module 107 determines that the selected service provider is unable to provide the service and drives the notification module 109 to transmit a re-selection message to the client device 2 of the service requester for the service requester to re-select another service provider preferred from the list of service providers and waits for the confirmation from another service provider.

In one embodiment, the receiving module 101 is operable to receive a service evaluation corresponding to the selected service provider from the client device 2 of the service requester through the network and stores the received service evaluation in service databased of the storage device 11. The service evaluation may include the indication of the service quality corresponding to the service provider and may be provided as reference to the service requester or another service requester for selecting the service provider in the next service requesting operation.

In one embodiment, the service requester and the service provider may be users or members of a social network e.g., Facebook, Google+, or Twitter. The service providers may constantly upload the daily routine route data and the service information onto the service database of the electronic apparatus 1 with their client devices 2 and the electronic apparatus 1 may provide the information associated with the service provider to the client device 2 of the service requester through the social network. However, the present disclosure is not limited to the example described herein.

In one embodiment, the receiving module 101, the coordinating module 105, and the notification module 109 may be implemented by any electronic communications means (e.g., communication chip with data processing capability), which incorporates both hardware and software components for performing communication through the network. The service matching module 103, and the determination module 107, and the notification module 109 may be implemented by a processing chip programmed with necessary codes and instructions to perform location-based service matching operation and coordination between the service requester and service provider. The processing chip may be realized as a central processing unit (CPU), a microcontroller, or an embedded controller.

However, it should be noted that the exact type, exact structure, and/or exact implementation method associated with the receiving module 101, the service matching module 103, a coordinating module 105, the determination module 107, and the notification module 109 may depend on the actual implementation of the electronic apparatus 1, and thus the instant embodiment is not limited thereto. It should be understood that FIG. 1 and FIG. 2 merely illustrate an implementation of the electronic apparatus 1, which may include fewer or more components than illustrated, or a different configuration of the various components in other embodiments. The present disclosure is not limited to FIG. 1 and FIG. 2.

Figure 3:
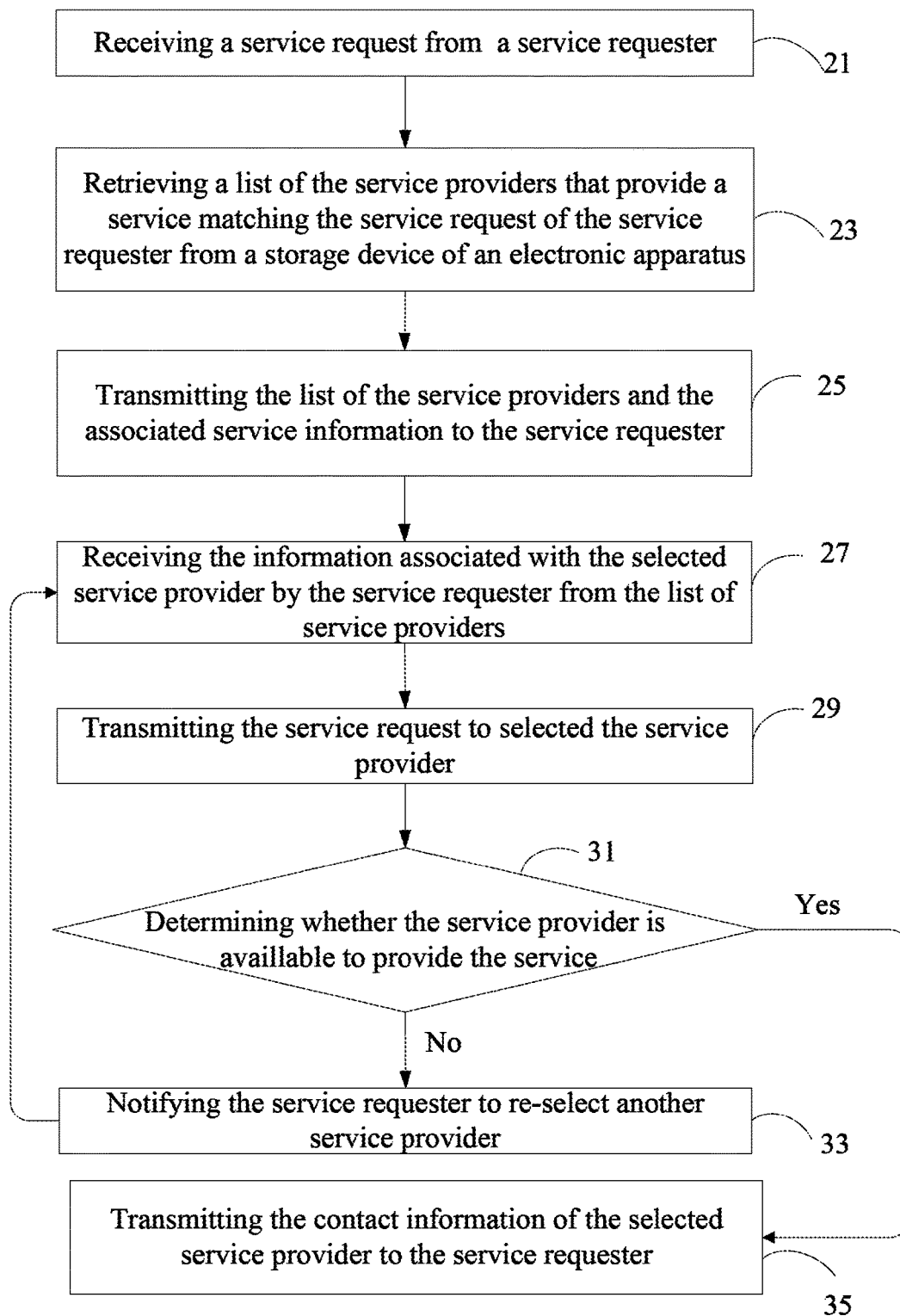
FIG. 3 is a flow chart illustrating a method for providing location-based service provided in accordance to an exemplary embodiment of the present disclosure.

Referring to FIG. 3 in conjunction with FIG. 1 and FIG. 2, which illustrates a flowchart of a method for location-based system provided in accordance to an exemplary embodiment. The method is provided by way of example, as there are a variety of ways to carry out the method. The method described below can be carried out using the configurations illustrated in FIGS. 1 and 2, for example, and various elements of these figures are referenced in explaining the method of FIG. 3. Each block shown in FIG. 3 represents one or more processes, methods or subroutines, carried out in the method. Furthermore, the illustrated order of blocks is illustrative only and the order of the blocks can change according to the present disclosure. Additional blocks can be added or fewer blocks may be utilized, without departing from this disclosure.

At block 21, the receiving module 101 receives the service request sent by a service requester using the client device 2 through the network. In the instant embodiment, a service requester initiates the application program installed on the corresponding client device 2 to generate a service request and operate the client device 2 to transmit the service request to the electronic apparatus 1 via the network. The service request in one embodiment may include a service time requested, a service location requested, a type of service requested, as well as a location data generated by the client device 2 of the service requester based on the location of the service requester. The service request in another embodiment may include only a service requested and the location data of the service requester.

At block 23, the service matching module 103 retrieves a list of the service providers matching the service request of the service requester from the service database, e.g., a list of the service providers providing the service and at the location matching the service request of the service requester. The service database is pre-stored in the storage device 11 of the electronic apparatus 1. The service database includes a plurality of daily routine routes of a plurality of service providers and the service information. The daily routine routes and the service information associated with each of the service providers may be provided and uploaded by each individual service provider to service database using the corresponding client device 2. In one embodiment, each service provider may constantly update the associated daily routine route and the service information. The service information may include but is not limited to a service route information, a service time, and the type of service provided. The type of service provided may include a ride service, a car-pool service, a procurement service, a food delivery service, a child care service, a senior care service, a tutor finding service, and a designated driver service.

In at least one embodiment, when the service matching module 103 is unable to find a match to a service route that encompasses the location of the service requester in the service database, the service matching module 103 computes a shortest service route to the location of a service provider recorded in the service database based on the location data of the service requester to the client device 2 of service requester.

At block 25, the coordinating module 103 transmits the list of the service providers and the associated service information corresponding to each service provider to the client device 2 of the service requester. The service requester uses the client device 2 to selects a service provider from the list of the service providers based on the service information and/or the service evaluations of the service providers. In one embodiment, the service requester may select one service provider having the shortest route to the service requester among the service providers. In another embodiment, the service requester may select one service provider capable of providing the service at the service time desired by the service requester among the service providers. In further embodiments, the service requester may select one service provider that provides best service among the service providers according to the service evaluation. Afterwards, the client device 2 of the service requester generates and sends information associated with the service provider selected by the service requester to the electronic apparatus 1.

At block 27, the receiving module 101 receives the information associated with the service provider selected by the service requester from the list of service providers.

At block 29, the coordinating module 105 transmits the service request to the client device of the selected service provider for service availability confirmation.

At block 31, the determination module 107 determines whether the selected service provider is available to provide the service to the service requester.

When the client device 2 of the selected service provider receives a confirmation message from the service provider, the determination module 107 determines that the selected service provider is able to provide the service to the service requester and executes block 35. When the client device 2 of the selected service provider receives a request declining message from the selected service provider, the determination module 107 determines that the selected service provider is unable to provide the service and executes block 33.

At block 33, the determination module 107 drives the notification module 109 to transmit a re-selection message to the client device 2 of the service requester for the service requester to re-select another service provider preferred from the list of service providers and awaits the confirmation from another service provider.

At block 35, the determination module 107 drives the notification module 109 to transmit the contact information of the selected service provider to the client device 2 of the service requester.

After the service requester receives the service from the service provider, the service requester may send a service evaluation corresponding to the selected service provider to the electronic apparatus 1 via the application program on the client device 2 of the service requester. The receiving module 101 of the electronic apparatus 1 receives the service evaluation from the service requester and stores the data in the service database, accordingly.

In comparison to prior technology, the method and system for providing location-based service, by establishing a service database containing a plurality of routes travelled by a plurality of users in their daily life, enables a user to quickly find a service provider to provide a service requested by a user at a specific location from the service database upon receiving a service request. Thereby, bringing great convenience to the daily life of the user and an increase in living quality.

Additionally, the present disclosure also discloses a non-transitory computer-readable media for storing the computer executable program codes of the method for providing location-based service depicted in FIG. 3. When the non-transitory computer readable recording medium is read by a processor, the processor executes the aforementioned method for providing location-based service. The non-transitory computer-readable media may be a floppy disk, a hard disk, a compact disk (CD), a flash drive, a magnetic tape, accessible online storage database or any type of storage media having similar functionality known to those skilled in the art.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for providing location-based service comprising:
    receiving, by an electronic apparatus, a service request from a first device, wherein the service request includes a service requested by a service requester and a location data corresponding to a location of the service requester;
    retrieving, by the electronic apparatus, a list of service providers matching the service request;
    providing, by the electronic apparatus, a shortest service route to the location of a service provider recorded in a service database to the first device based on the location data when the electronic apparatus finds no match to a service route that encompasses the location of service requester in the service database;
    transmitting, by the electronic apparatus, the list of the service providers and associated information corresponding to the service providers to the first device;
    receiving, by the electronic apparatus, information associated with one service provider selected by the service requester among the service providers from the first device; and
    transmitting, by the electronic apparatus, the service request to a second device of the selected service provider.

2. The method for providing location-based service according to claim 1, further comprising:
    receiving, by the electronic apparatus, a confirmation message from the second device; and
    transmitting, by the electronic apparatus, a contact information of the selected service provider to the first device in response to the confirmation message.

3. The method for providing location-based service according to claim 2, further comprising:
    receiving, by the electronic apparatus, a request declining message from the second device; and
    transmitting, by the electronic apparatus, a re-selection message to the first device in response to the request declining message.

4. The method for providing location-based service according to claim 3, further comprising:
    receiving, by the electronic apparatus, information associated with another service provider selected by the service requester among the list of service providers from the first device.

5. The method for providing location-based service according to claim 2, further comprising:
    receiving, by the electronic apparatus, a service evaluation corresponding to the selected service provider from the first device; and
    storing the received service evaluation in a storage device of the electronic apparatus.

6. The method for providing location-based service according to claim 1,
    wherein the service database is pre-stored in a storage device of the electronic apparatus.

7. The method for providing location-based service according to claim 1, wherein the service provider is selected from the list of service providers based on a service evaluation of the selected service provider.

8. The method for providing location-based service according to claim 1, wherein the list of service providers is pre-stored in a storage device of the electronic apparatus.

9. The method for providing location-based service according to claim 1, wherein the service information includes a service route information, a service time, and a type of service provided.

10. An electronic apparatus connected to a first device and a second device through a network, the electronic apparatus comprising:
a storage device with a built-in service database;
a receiving module, configured to receive a service request sent by the first device, wherein the service request includes a service requested by a service requester and a location data corresponding to a location of the service requester;
a service matching module coupled to the receiving module and configured to retrieve a list of the service providers matching the service request of the service requester from the storage device;
the service matching module further configured to provide a shortest service route to the location of a service provider recorded in the service database to the first device based on the location data of the service requester when the service matching module finds no match to a service route that encompasses the location of the service requester in the service database; and
a coordinating module coupled to the service matching module and configured to transmit the list of the service providers and associated service information to the first device;
wherein the receiving module is further configured to receive information associated with one service provider selected by the service requester from the list of service providers from the first device, and the coordinating module is further configured to transmit the service request to the second device for confirmation.

11. The electronic apparatus according to claim 10, further comprises
a notification module coupled to the coordinating module and configured to transmit a contact information of the selected service provider to the first device in response to a confirmation message received from the second device of the selected service provider.

12. The electronic apparatus according to claim 11, wherein the notification module is configured to transmit a re-selection message to the first device to notify the service requester to select another service provider from the list of service provider in response to a request declining message received from the second device, and the coordinating module is further configured to transmit the service request to a third device of another service provider for the confirmation.

13. The electronic apparatus according to claim 10, wherein the receiving module is further configured to receive a service evaluation corresponding to the selected service provider from the first device and store the service evaluation received in the storage device.

14. The electronic apparatus according to claim 10, wherein the service information includes a service route information, a service time, and a type of service provided.

15. The electronic apparatus according to claim 10, wherein the electronic apparatus is one of a server, a personal computer, and a smartphone.

16. The electronic apparatus according to claim 10, wherein each of the first and the second devices is one of a laptop, a tablet, and a smartphone.

* * * * *